April 18, 1961     J. I. DETWEILER ET AL     2,980,138
CONTROLLABLE RATE VALVE
Filed Dec. 10, 1956                        2 Sheets-Sheet 2
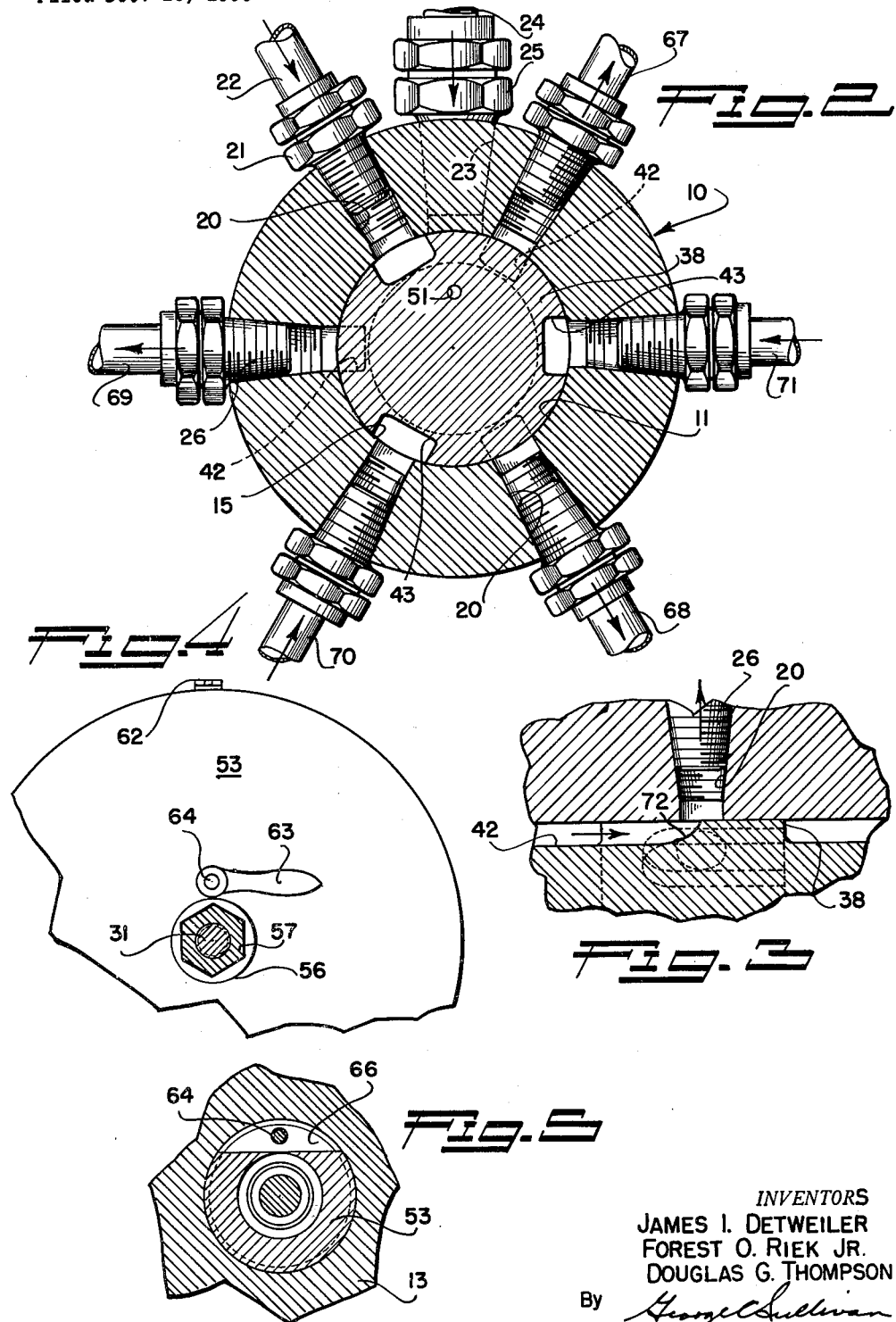
INVENTORS
JAMES I. DETWEILER
FOREST O. RIEK JR.
DOUGLAS G. THOMPSON
By George C. Sullivan
              Agent United States Patent Office 2,980,138
Patented Apr. 18, 1961

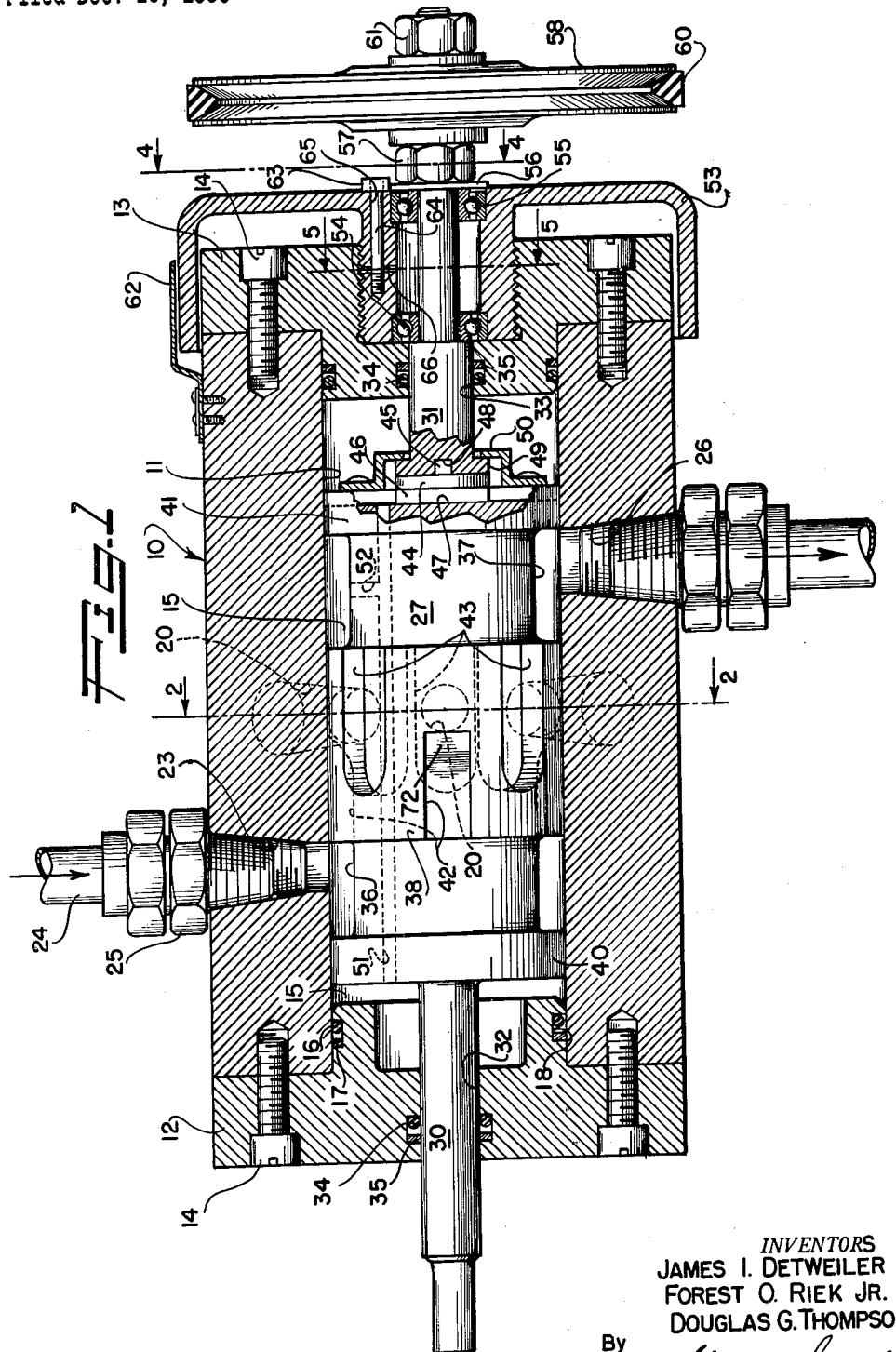

2,980,138

CONTROLLABLE RATE VALVE

James I. Detweiler, Burbank, and Forest O. Riek, Jr., and Douglas G. Thompson, Los Angeles, Calif., assignors to Lockheed Aircraft Corporation, Burbank, Calif.

Filed Dec. 10, 1956, Ser. No. 627,410

1 Claim. (Cl. 137—624.13)

This invention relates to valves and, more particularly, to a valve that provides separately controllable frequency amplitude patterns of a fluid pressure.

It has heretofore been a major problem in testing hydraulic lines and apparatus, for example, to provide a plurality of hydraulic pressure surges which are controllable in frequency and magnitude. Attempts have been made to employ a variety of solenoid operated hydraulic valves, motor operated hydraulic valves, and pilot operated valves. Some of these valves are suitable for controlling frequency of hydraulic pressure surges but not of the magnitude of each surge whereas other valves control magnitude but lack frequency control. These features are particularly important when hydraulic lines are being tested to determine their serviceability and destruction limits.

Accordingly, the present invention provides a valve having a fluid pressure path extending between an input port and an output port including a plurality of test ports disposed about the valve between the input and output ports. The valve includes a rotor whose rotation controls the frequency of pressure surges applied to the test ports and whose longitudinal displacement within the valve controls the magnitude of the pressure surges.

In one form of the invention, the rotor is provided with a first and second set of channels which communicate between the input port and the test port and the test port and the output port respectively. Longitudinal displacement of the rotor within the valve arranges the first set of channels to provide a predetermined pressure surge to the test ports while rotation of the rotor controls surge frequency. The second set of channels return or relieve fluid present in the test ports.

It is an object of the present invention to provide a valve suitable for controlling the frequency and magnitude of fluid pressure surges. For example, the frequency responses are preferably controllable from some low frequency up to 4,000 cycles having a pressure peak in excess of system pressure, say 150% of system pressure.

It is another object of the present invention to provide a means for permitting longitudinally displacing of a rotor within a chamber provided in a valve whereby fluid may be transferred from one section of the valve to another.

It is another object of the present invention to provide a fluid servo system wherein mechanical displacement and rotation of a valve rotor can be converted into fluid surges the magnitudes of which are proportional to the rotor displacement. These fluid surges may be employed as control signals, for example, in an aircraft autopilot system.

Still another object of the present invention is to provide means for controlling fluid pressures so that hoses, lines, regulators, valves, etc. may be destructive tested to determine operating limits. The same means may also be used to supply controlled fluid pressure of a given frequency and magnitude to qualify production fluid carrying apparatus and equipment as an inspection procedure.

Further objects of our invention will become apparent as the detailed description of the embodiment of my invention illustrated in the accompanying drawings proceeds.

As shown in the drawings:

Figure 1 is a sectional view of a valve in accordance with the present invention wherein fluid can be controllably applied from a source for delivery through a plurality of test ports;

Figure 2 is a cross sectional view taken in the direction of arrows 2—2 of Figure 1, illustrating the plurality of test ports in relation to the first and second set of channels provided on the rotor;

Figure 3 is a sectional view illustrating the relationship between the first set of channels and a test port to control the magnitude of fluid surges;

Figure 4 is an end view taken in the direction of arrows 4—4 of Figure 1; and

Figure 5 illustrates the lock mechanism taken in the direction of arrows 5—5 of Figure 1.

With reference to Figures 1 and 2, a valve is shown in accordance with the present invention wherein a cylindrical body 10 is shown having a bore 11 and a pair of end members 12 and 13 secured to the body by means of a plurality of screws, such as screw 14. The end members close bore 11 to provide a chamber 15. Suitable O rings 16 and backup rings 17 are employed in an annular groove 18 formed in each end member to properly seal the chamber 15 in order to prevent escape of fluid contained therein.

Disposed about the middle of body 10 there is provided a plurality of test ports 20 communicating a portion of chamber 15 with the exterior of body 10. Test lines may be coupled to the body by inserting line fittings into the test ports, such as fitting 21 carried by test line 22.

An input port 23 is provided between end member 12 and the test ports through which a fluid under pressure is supplied to chamber 15 via a fluid line 24 coupled to port 23 by means of fitting 25. An output or return port 26 is provided between end member 13 and the test ports through which the fluid in chamber 15 may be returned to its source of supply (not shown).

Slidably carried by the valve body 10 within chamber 15, there is provided a rotor 27 floating diametrically within the chamber having a pair of extensions or spindles 30 and 31 projecting through bores 32 and 33 provided in end members 12 and 13, respectively. The extensions are provided for pressure balancing of the rotor. A pair of O rings 34 and backup rings 35 are provided in each bore 32 and 33 for sealing purposes.

The rotor is formed with a pair of annular recesses 36 and 37 associated with input port 23 and output port 26 respectively and separated by a raised central portion 38. The pair of annular recesses are further defined by raised end portions 40 and 41 provided on opposing ends of the rotor. Central portion 38 and the end portions 40 and 41 slidably engage bore 11 of body 10. Raised central portion 38 is provided with a first set of input channels 42 and a second set of output channels 43.

Extension 30 is integrally formed with the rotor whereas extension 31 is fastened thereto by means of a conventional double sliding coupling comprising disc 44 having a pair of keys 45 and 46 perpendicular to each other engageable in a slot 47 provided in the rotor and slot 48 provided in the end of the extension 31 respectively. A collar 49 is attached to the rotor and engages an annular shoulder 50 provided on the end of the extension 31 to secure the double sliding coupling.

In order to permit the rotor to be displaced longitudinally within chamber 15 of body 10 and to provide pressure balance, a bore 51 is provided which communicates one end of chamber 15 and its opposite end so that fluid may be transferred therebetween. A bore 52 is provided in the rotor which communicates bore 51 with the output recess 37 so that as the rotor is longitudinally displaced within the chamber, fluid may pass through bores 51 and 52 into the opposite end of chamber 15 and also to the output port 26. A cap 53 is threadably engageable with end member 13 and is engageable with the end of extension 31 by means of a pair of bearings 54 and 55. Rotation of cap 53 is transferred to longitudinal displacement of the rotor by means of a washer 56 carried by extension 31 against bearing 55 by a nut 57.

Rotation of the rotor is accomplished by means of a pulley 58 and belt 60 attached to extension 31 between nut 57 and a retaining nut 61. An indicator finger 62 is shown attached to the valve body 10 so that the finger may be aligned with indicia (not shown) inscribed on the cap 53 to indicate the position of the rotor with respect to the chamber.

With reference to Figures 1, 4 and 5, means are shown for locking the cap to end member 13. This latter means comprises an arm 63 attached to a lock screw 64 which is threadably engaged through a bore 65 provided in the cap. Bore 65 passes through the cap. A small slit 66 is provided in a portion of the cap, as shown in Figure 5, whereby the rotation of screw 64 in bore 65 draws the slot 66 close to bind the threads engaging cap 53 with end member 13.

With reference to Figure 2, the relationship between the first and second sets of channels provided on the rotor is shown with respect to input port 23 and the plurality of test ports. This relationship shows fluid under pressure being supplied to test lines 67, 68 and 69 in the direction of associated arrows via the test ports while the second set of output channels draws fluid under pressure from test lines 70, 22 and 71. The rate of test port opening is dependent upon the speed of rotor rotation. Increasing the speed of rotor rotation draws less fluid from the test lines by the output channels to be returned to the supply system whereas a decrease in rotor frequency allows more fluid to be drawn from the test lines and consequently the frequency of fluid pressure surges is controllable.

With reference to Figure 3, it can clearly be seen that the magnitude of each fluid pressure surge is dictated by the alignment of the plurality of test ports, such as test port 20, with the first set of input channels, such as channel 42, so that fluid supplied to input recessed area 36 will pass via the input channels to the test ports. The more channel 42, for example, is exposed to port 20, the more fluid is supplied to the test line. Consequently, it can be seen that longitudinal displacement of rotor 27 controls the magnitude of fluid pressure surges. To insure a proper flow of fluid, the end of each input channel is provided with a tapered or contoured surface 72 formed in central raised portion 38 of rotor 27 so that fluid under pressure may easily be diverted from the input channel to the test port.

In actual operation, fluid pressure is provided to chamber 15 via input line 24 coupled to the input port 23. A return line is fixed to output port 26 to return fluid supplied by the fluid pressure system (not shown). Impeding the flow of fluid from the input port 23 to the test ports 20 is the raised central portion 38 formed on rotor 27 which permits fluid to flow about the rotor contained within input recess 36. However, as cap 53 is rotated to a pre-set postion, rotor 27 is longitudinally displaced within bore 11 of body 10 which aligns input channels 42 with test ports 20 to allow a flow of fluid of predetermined pressure to pass therethrough from the input recess into test lines associated with each test port.

As rotor 27 is rotated by a driving means (not shown) via pulley wheel 58 and belt 60 attached to extension 31, fluid under pressure is received into input recess 36 and conducted through the plurality of input channels 42 to the test ports as described above. However, the rate or speed of rotor rotation causes the fluid to be supplied to the test ports for a predetermined time period followed by restricting the supply due to the raised central portion 38 separating the input channels from the output channels. As the rotor continues rotation, output channel 43 communicates with the test ports and fluid return is achieved from the test lines into output recess 37 and output port 26 when the test port is aligned with output channel 43. Thus, it can be seen that controllable fluid pressure surges can be obtained in regards to frequency of surges and magnitude thereof.

Having described only typical forms of the invention, we do not wish to be limited to the specific details herein set forth, but wish to reserve to ourselves any variations or modifications that may appear to those skilled in the art and fall within the scope of the following claim.

We claim:

A valve for causing pressure cycling of incompressible fluid contained in test lines comprising a body member having an elongated sealed cylindrical chamber therein, a fluid input port and a fluid return port communicating said chamber with the exterior of said body member for conducting incompressible fluid to and from the valve, at least two test line ports communicating the interior of said member with the exterior and disposed between said input and said return ports, a cylindrical fluid control means rotatably and axially movable within said sealed chamber of said member, a driven spindle for rotatably mounting one end of said control means, a driving spindle for rotatably mounting one end of said control means and for supplying rotation to said control means, a first and a second annular recess formed in the periphery of said control means for cooperating respectfully with said input and said return ports, at least one input channel axially aligned with said driving spindle upon said control means between said first recess and a plane containing at least one of said test line ports, at least one return channel axially aligned with said driving spindle upon said control means between said second recess and a plane containing at least another of said test line ports, a rotatable adjustment cap threadably engaged with said body member coaxially with said driving spindle, said driving spindle rotatably mounted coaxially within said rotatable cap for axial movement therewith, said adjustment cap operative to axially reciprocate said control means for varying the contact area of said input channel with said one test line port, whereby the frequency of said pressure cycling may be controlled by rotation of said driving spindle and the magnitude of the pressure of said incompressible fluid may be varied by rotation of said adjustment cap which in turn axially moves said driving spindle and said control means to vary said contact area.

References Cited in the file of this patent

UNITED STATES PATENTS

| | | |
|---|---|---|
| 685,510 | Flint | Oct. 29, 1901 |
| 988,945 | Moorhead | Apr. 4, 1911 |
| 1,644,093 | Shonnard | Oct. 4, 1927 |
| 2,145,383 | Alden | Jan. 31, 1939 |
| 2,312,941 | Tucker | Mar. 2, 1943 |
| 2,313,257 | Nelson | Mar. 9, 1943 |
| 2,314,428 | Schouten | Mar. 23, 1943 |
| 2,327,046 | Hunter | Aug. 17, 1943 |
| 2,345,073 | Rosett | Mar. 28, 1944 |
| 2,818,881 | Bonner | Jan. 7, 1958 |